(12) United States Patent
Nieto Londoño et al.

(10) Patent No.: US 10,184,447 B2
(45) Date of Patent: Jan. 22, 2019

(54) AERODYNAMIC ROTOR BLADE

(71) Applicant: UNIVERSIDAD PONTIFICIA BOLIVARIANA, Medellín (CO)

(72) Inventors: César Nieto Londoño, Medellín (CO); Juan Guillermo García Navarro, Medellín (CO); Julián Sierra Pérez, Medellín (CO)

(73) Assignee: Universidad Pontificia Bolivariana, Bogota (CO)

( * ) Notice: Subject to any disclaimer, the term of this patent is extended or adjusted under 35 U.S.C. 154(b) by 414 days.

(21) Appl. No.: 14/414,276

(22) PCT Filed: Jul. 13, 2013

(86) PCT No.: PCT/IB2013/055783
§ 371 (c)(1),
(2) Date: Apr. 20, 2015

(87) PCT Pub. No.: WO2014/009934
PCT Pub. Date: Jan. 16, 2014

(65) Prior Publication Data
US 2015/0219069 A1     Aug. 6, 2015

(30) Foreign Application Priority Data
Jul. 13, 2012   (CO) .................................. 12-118162

(51) Int. Cl.
*F03D 1/06*     (2006.01)
*F03D 1/00*     (2006.01)

(52) U.S. Cl.
CPC ............. *F03D 1/0633* (2013.01); *F03D 1/00* (2013.01); *F05B 2240/2213* (2013.01); *Y02E 10/721* (2013.01)

(58) Field of Classification Search
CPC .................. F03D 1/0608; F03D 1/0633; F05B 2240/2213; F05B 2240/30; F05B 2240/301; F05B 2240/302; Y02E 10/721
See application file for complete search history.

(56) References Cited

U.S. PATENT DOCUMENTS

| | | | |
|---|---|---|---|
| 2011/0229331 A1 | 9/2011 | Fischer | |
| 2012/0020803 A1* | 1/2012 | Lees | F03D 7/0236 416/233 |
| 2013/0315746 A1* | 11/2013 | Huang | F03D 1/0633 416/223 R |

FOREIGN PATENT DOCUMENTS

| | | | |
|---|---|---|---|
| DE | 3047501 A1 | 1/1982 | |
| DE | 3130257 A1 * | 2/1983 | ........... F03D 1/0608 |

(Continued)

OTHER PUBLICATIONS

Machine Translation of DE 3130257 A1.*

(Continued)

*Primary Examiner* — Logan Kraft
*Assistant Examiner* — Elton Wong
(74) *Attorney, Agent, or Firm* — The MOrales Law Firm, LLC; Joseph L. Morales

(57) ABSTRACT

The invention is related to a rotor blade for the generation of electrical power. The rotor blade transforms the kinetic energy of a fluid, into rotational movement of a mechanical shaft. The shape of the rotor blade is characterized in that, along an axis, it is longitudinally bound by a root (a) and a tip (b), which are connected through multiples curved segments, called neutral sectional axes $[En_i]$. All $[En_i]$ generate a continuous or discontinuous curvature called Primary Neutral Axis [En]. The point corresponding to a leading edge and a trailing edge, configure an airfoil $[PA_{ij}]$. The curvature of the blade (e) has an arch of length L, and is defined by the neutral sectional axes $[En_i]$. The blade (e) is (Continued)

defined by at least one continuous curved section called primary neutral axis [En] having a length [$L_n$]. The blade's shape has a variable cross section along the Primary Neutral Axis [En].

17 Claims, 12 Drawing Sheets

(56) References Cited

FOREIGN PATENT DOCUMENTS

| | | | | |
|---|---|---|---|---|
| DE | 4030559 A1 | * | 4/1992 | ............ F03D 1/0608 |
| ES | 2351317 T | | 3/2011 | |
| WO | WO2012053602 A1 | | 4/2012 | |

OTHER PUBLICATIONS

Machine Translation of DE 4030559 A1.*
Issued patent from foreign priority document previously submitted.

* cited by examiner

AERODYNAMIC ROTOR BLADE

FIELD OF THE INVENTION

The present invention refers to renewable energy generation, particularly those taking advantage of fluid kinetic energy. The present invention refers more specifically to the non-conventional design of the shape of a rotor blade belonging to a machine which generates power from the transformation of kinetic energy found in moving fluids.

DESCRIPTION OF PRIOR ART

The wind power generation industry is currently searching for technologies which will make the power generation process more efficient and therefore focus their efforts into researching areas such as blade development having more efficient shapes allowing to better capture wind energy. This leads to innovation in specific issues such as aerodynamic improvements, the use of novel materials, control systems and blade manufacturing methodologies, the former being the work niche of the present invention. To date, there are developments and documents which may be included within the category in which the present invention is found, given their result are non-conventional blade shapes; however, its operative improvement lies in completely different features. US2007/0013194A1 describes a non-conventional shape whose geometrical purpose is to reduce the aerodynamic noise generated by the rotor during operation and the purpose of the curvature in the invention is geared towards reducing the rotor's diameter given it prompts more effective kinetic energy capture from fluid by having a greater aerodynamic area. US2011/0070094 A1 describes an invention whose shape possesses a curvature which under principles different than aerodynamic forces, such as area reduction and Newton's third law of action reaction, prompt rotational blade movement, in addition, its cross-section is generated by the constant thickness sheet which channels fluid within the concave surface, in contrast to the cross-section of the present invention which uses a variable aerodynamic profile as a function of taking advantage of fluid-dynamic forces generated once the fluid passes through the inferior and superior zone of the profile. Other documents associated to the non-conventional blade category are CN101846042A and JP2010261431A, which have no similarity whatsoever with the operation or disposition of the present invention, and whose only relationship with the present invention lies in the implementation of non-conventional blade shapes of wind power generators.

The present invention comprises a solution to some of the problems and needs of the low-scale wind power generation industry, wherein current worldwide equipment installed offer in their vast majority efficiencies ranging anywhere between 20 to 30%; said value expected to be increased with new technologies and design methodologies. The present invention is directed precisely to increase said efficiency, reaching efficiency values between 45 and 55%.

BRIEF DESCRIPTION OF THE INVENTION

Figure 1:
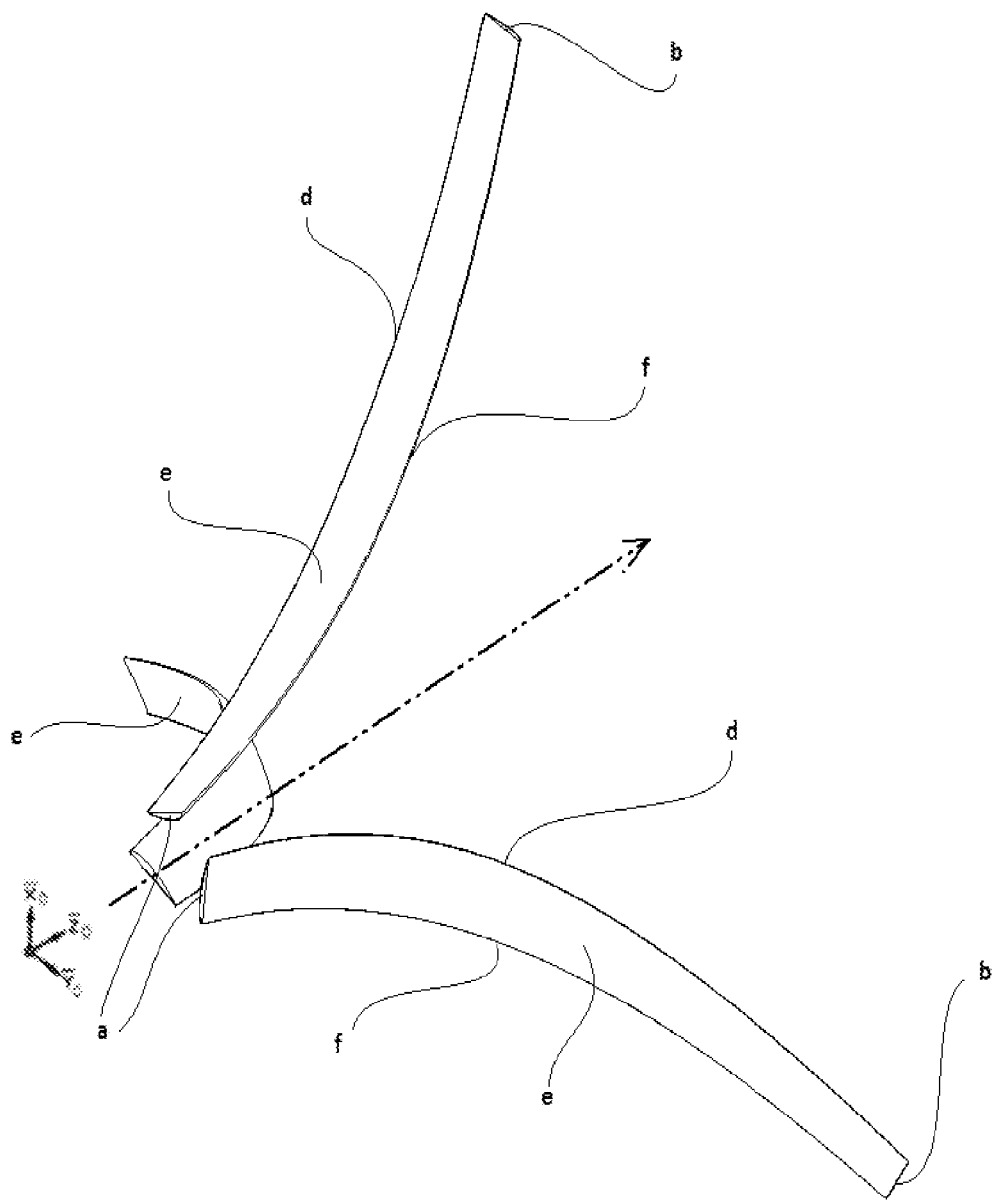
FIG. 1 illustrates a preferred embodiment of the blade and the direction wherein the fluid is moving in the present invention.

The present invention discloses a blade for the generation of electrical energy stemming from the transformation of kinetic energy of a fluid, in rotational movement. Said rotational movement is moved to a central horizontal axis which may be coupled to an electric generator. Said horizontal axis is found defined by a Cartesian axis $\vec{Z}_0$ which together with Cartesian axes $\vec{X}_0$ $\vec{Y}_0$, form a global orthogonal framework of clearance planes.

Blade (e) has a particular geometrical shape which extends along axis $\vec{Z}_0$, moving away thereof as it continues to develop, and is limited longitudinally by Base (a) and Tip (b), whose connection is obtained by a series of sectional and constant curvatures called Sectional Neutral Axes $[En_i]$ which generate all together a continuous or discontinuous primary curvature called Primary Neutral Axis [En]. Cross-sectionally, it is found limited by an Leading Edge (f) and an Trailing Edge (d), which when joined by one or two continuous curves which connect several points, amongst them the point corresponding to the leading edge and the trailing edge, form an Aerodynamic Profile $PA_{ij}$ having a variable or constant thickness. The volume defined by these five borders (Base, Tip, Leading Edge, Trailing Edge, Aerodynamic Profile) generates the shape of the blade.

The main geometrical feature of the blade is the curvature, defined by the Sectional Neutral Axes $[En_i]$, which as mentioned above, when joined form the Primary Neutral Axis [En] whose curvature length is given by L, which may lie in the range of 0.01 m≤L≤30 m. In order to create this curvature, a series of points $Pc_{ij}$ are joined; these points are constructed along the bottom curve describing aerodynamic profile $PA_{ij}$, at a distance of c/4 from the leading edge point, c being the length of the aerodynamic profile chord.

Said Primary Neutral Axis [En] is included within plane P, which coincides with the $\vec{X}_0 \vec{Z}_0$ plane. The initial point of Primary Neutral Axis [En], the base, is located by an auxiliary reference framework $\vec{X}_1 \vec{Y}_1 \vec{Z}_1$; initiating at the intersection of plane $\vec{X}_1 \vec{Y}_1$ which is parallel to plane $\vec{X}_0 \vec{Y}_0$ and perpendicular to the rotation axis $\vec{Z}_0$; with plane $\vec{Y}_1 \vec{Z}_1$ which is parallel to plane $\vec{Y}_0 \vec{Z}_0$; and to plane $\vec{X}_1 \vec{Z}_1$ which coincides with plane $\vec{X}_0 \vec{Z}_0$ and thus with plane P, if the preferred embodiment is had. This intersection point 1 between the auxiliary planes, is where Primary Neutral Axis [En] begins and is also identified as the initial point of the first of three division sections of [En].

The first section of division $L_1$ corresponds, in the blade's preferred embodiment, to 20% of L; however, it may range between $0.15*L \leq L_1 \leq 0.25*L$. This section is limited by points 1 and 2, whereby the latter is found towards the end of the length of $L_1$ over Sectional Neutral Axis [$En_1$]. The second division section is defined by $L_2$; this section begins at point 2 and ends at point 3 located over Sectional Neutral Axis [$En_2$], in accordance to the preferred embodiment, this section has a length corresponding to 40% of L, but however it may vary between $0.3*L \leq L_2 \leq 0.5*L$. The last division section of the blade corresponds to $L_3$ and is limited by points 3 and 4; its length, as defined in the preferred embodiment is 40% of L, and like the other sections has a length between $0.3*L \leq L_3 \leq 0.5*L$. The different arches defining each one of these sections, are tangents at each one of the connection points, i.e., section $L_1$ is tangent to section $L_2$ at point 2 and section $L_2$ is tangent to section $L_3$ at point 3.

The shape of the blade undergoes a series of variations in its cross-section, which develop along the Primary Neutral Axis [En] from point 1 to point 4 and which like curvature L, these variations are analyzed at the same three sections $L_1 L_2 L_3$. The first variation evidenced is the length of the cross-section, seen as the decrease or increase of the length of chord length c of aerodynamic profile $PA_{ij}$. The length of said cross section is bound by ranges $0.05*L \leq c_{11} \leq 0.3*L$ and $0.01*L \leq c_{33} \leq 0.3*L$, for aerodynamic profiles located at the base and tip of the blade, respectively.

The second geometrical variation corresponds to an inclination which varies along Primary Neutral Axis [En] from point 1 to point 4 and which like curvature L, these variations are analyzed at the same three sections $L_1 L_2 L_3$. This inclination is measured as a function of angle $\alpha_{ij}$ which is formed between chord length c of each $PA_{ij}$ profile and a perpendicular axis u to plane P which intersects Primary Neutral Axis [En] at point $Pc_{ij}$. This angle may be both positive as well as negative, having angle 0° as an inflection point, which is formed when the a axis is parallel to the c chord. A positive angle exists when said angle grows clockwise and negative when counter-clockwise.

At the base of the blade, the inclination angle may range between the following values, $-38° \leq \alpha_i \leq 148°$ and the tip's inclination angle may range between $-46° \leq \alpha_i \leq 40°$. However, in the preferred embodiment the inclination is found between $-31° \leq \alpha_i \leq 30°$ and $-44° \leq \alpha_i \leq 16°$ for the base and tip, respectively.

For a configuration with greater performance, said inclination lies in the following ranges: $5° \leq \alpha_i \leq 25°$ and $-5° \leq \alpha_i \leq 15°$, for the base and tip respectively.

DETAILED DESCRIPTION OF THE INVENTION

The present invention discloses a blade for electric power generation stemming from the transformation of a fluid's kinetic energy into rotational movement, wherein the capacity of kinetic energy transformation into rotation movement is directly correlated to the effective contact area between the blade and air flow. The present invention provides an increase of said effective area in contrast to a conventional flat blade, given its curved shape allows that for an equal effective diameter, a greater contact surface can be provided and thus a greater amount of energy generated.

In addition, the blade's curvature herein allows for the kinetic energy found in the fluid's flow to be used in a greater proportion in contrast to that obtained using a conventional mainly flat-shaped blade. The above due to that air flow impacting the blade does not do so perpendicularly as usually happens in conventional designs, wherein the greater part of the flow energy is transformed into drag forces associated to the pressure of impact, but instead, the flow impacting the blade does so at an angle with respect to the blade allowing for the flow to acquire velocity components which are used in kinetic energy transformation of the flow into rotational movement.

The present invention discloses a blade for the generation of electrical power from the transformation of a fluid's kinetic energy into rotation movement. Said rotational movement is moved to a central horizontal axis which may be coupled to an electrical generator. This rotation horizontal axis is defined by a Cartesian axis $\vec{Z}_0$ which together with Cartesian axes $\vec{X}_0$ $\vec{Y}_0$, form a global orthogonal framework of clearance planes.

Figure 2:
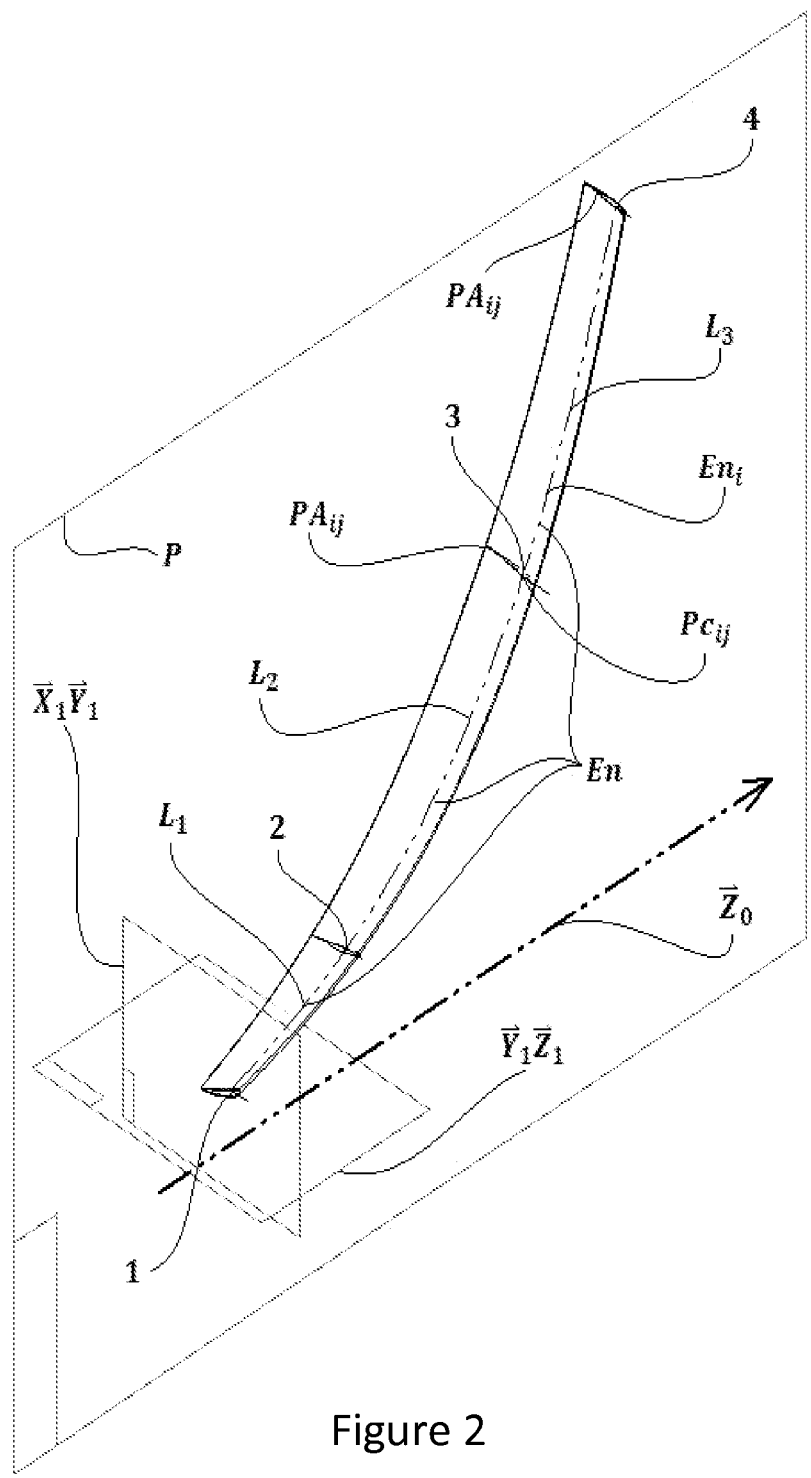
FIG. 2 illustrates an overall three-dimensional view of the blade and its primary neutral axis included in plane P.

Making reference to FIG. 1 and FIG. 2, an embodiment of blade (e) of the present invention is shown, having a particular geometrical shape which extends along axis $\vec{Z}_0$, moving away thereof as it continues to develop, and is limited longitudinally by Base (a) and Tip (b), whose connection is obtained by a series of sectional and constant curvatures called Sectional Neutral Axes [$En_i$] which generate all together a continuous or discontinuous primary curvature called Primary Neutral Axis [En].

Given the curvature of the Primary Neutral Axis [En] may be continuous or discontinuous, it is necessary, for the latter, divide its length in different sections which allows to characterize the invention in continuous curvatures or Sectional Neutral Axes [$En_i$]. The number of sections is one (1) for continuous Primary Neutral Axes [En] and at least two (2) for discontinuous Primary Neutral Axes [En], wherein $L_2$ comprises 50% of L and $L_3$ the other 50%. However, for the preferred embodiment, the blade is divided into three (3) sections represented by Sectional Neutral Axes [$En_1$], [$En_2$], [$En_3$] found between points 1-2; 2-3; and 3-4.

The first division section $En_1$ starts at point 1, has a preferred length of $L_1 = 0.2*L$ and ends at point 2. This section corresponds to the base zone, where the blade is attached to the horizontal rotation axis. $En_1$ is a constant curve obtained from the polynomial interpolation of various points. Its constant bending radius $Rp_1$ has a focus located at plane P at a preferred distance of $Rp_1 = 4*L_1$; said bending radius can range between $1.3*L_1 \leq Rp_1 \leq 57*L_1$. At point 1 and perpendicular to curve $En_1$, plane A is located and having an angle $\vec{X}\vec{Y}_1°$ with plane $\vec{X}_1 \vec{Y}_1$, said angle ranging between $0° \leq \vec{X}\vec{Y}_1° \leq 90°$. However, its preferred value ranging from $0° \leq \vec{X}\vec{Y}_1° \leq 40°$ and its greatest efficiency range between $10° \leq \vec{X}\vec{Y}_1° \leq 20°$.

In FIG. 2, section $En_1$ is observed formed by at least three (3) cross-sections, whose geometrical shape is an aerodynamic profile $PA_{ij}$, named $PA_{11}$, $PA_{12}$ and $PA_{13}$. Each one of these profiles are found on a plane perpendicular to $En_1$, the first plane A corresponds to profile $PA_{11}$ and located at point 1; the second plane B belongs to profile $PA_{12}$ and its location is at sectional neutral axis [$En_1$] at an intermediate point between 1 and 2; at the third plane D, the aerodynamic profile $PA_{13}$ is found and is located at point 2.

Figure 3:
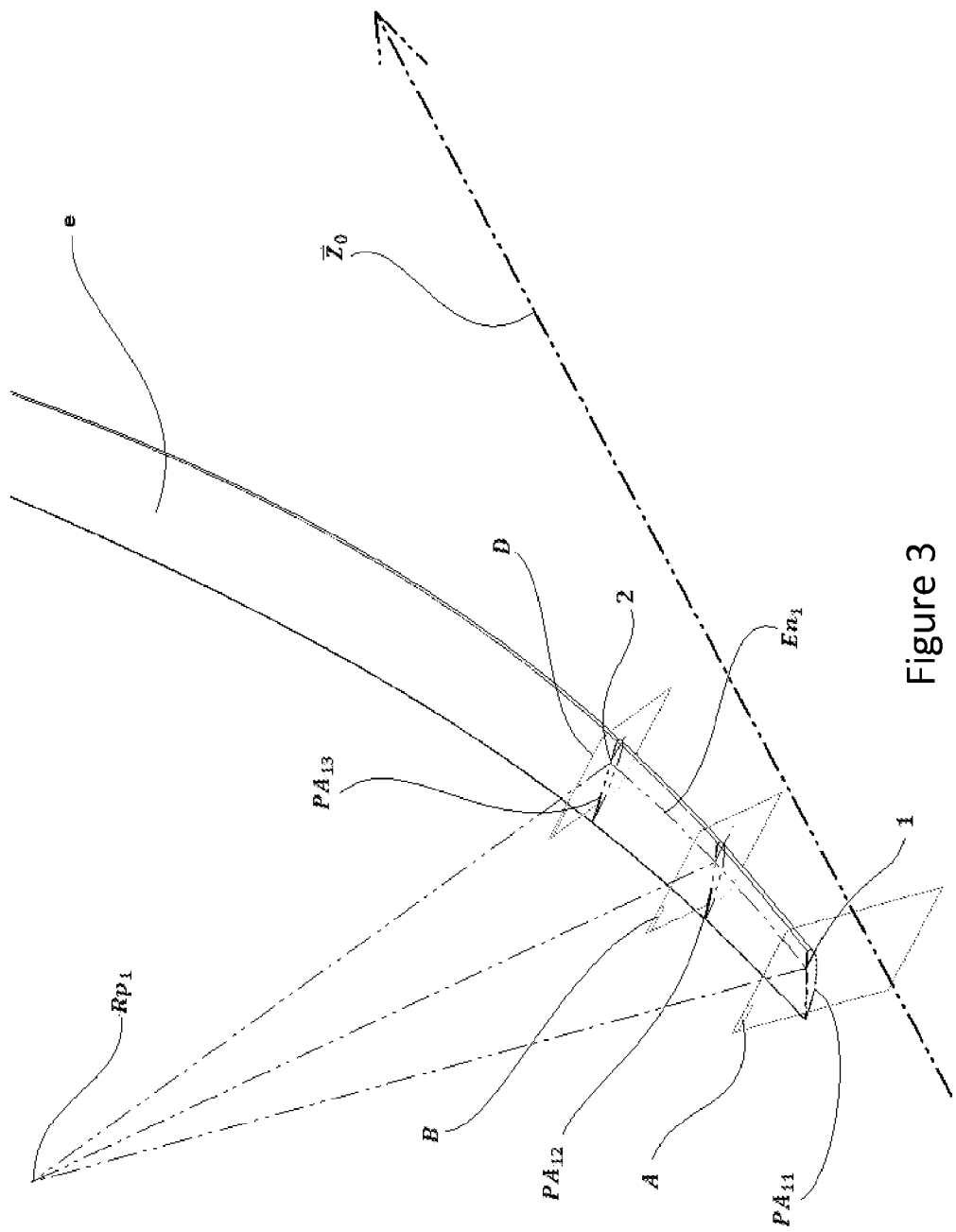
FIG. 3 illustrates a detailed view of the first section with its respective bending radius.

Making reference to FIG. 3, which illustrates a detailed view of the first section showing the respective bending radius, it may be noted that on the bottom curve of aerodynamic profiles $PA_{11}$, $PA_{12}$ and $PA_{13}$, called intratwo, points $Pc_{11}$, $Pc_{12}$ and $Pc_{13}$ are located, respectively. These points are located at a distance of c/4 from the leading edge and by joining them in an arch containing them, the Sectional Neutral Axis $[En_1]$ is obtained.

If a material extrusion is generated which follows the path described by the $En_1$ curve and said path conserves the shape of multiple cross-sections in its sweep (aerodynamic profiles), the solid having the geometric shape of the invention is generated at the base zone.

Using the configuration of greatest performance, this first section demonstrates a progressive change in its transverse length; this is due to the fact that chord length c suffers an increase in size as it moves away from the beginning of the $En_1$ curve at point 1, where the chord shows values of 0.082*L, 0.092*L, 0.099*L, for profiles $PA_{11}$, $PA_{12}$ and $PA_{13}$, respectively.

Figure 4:
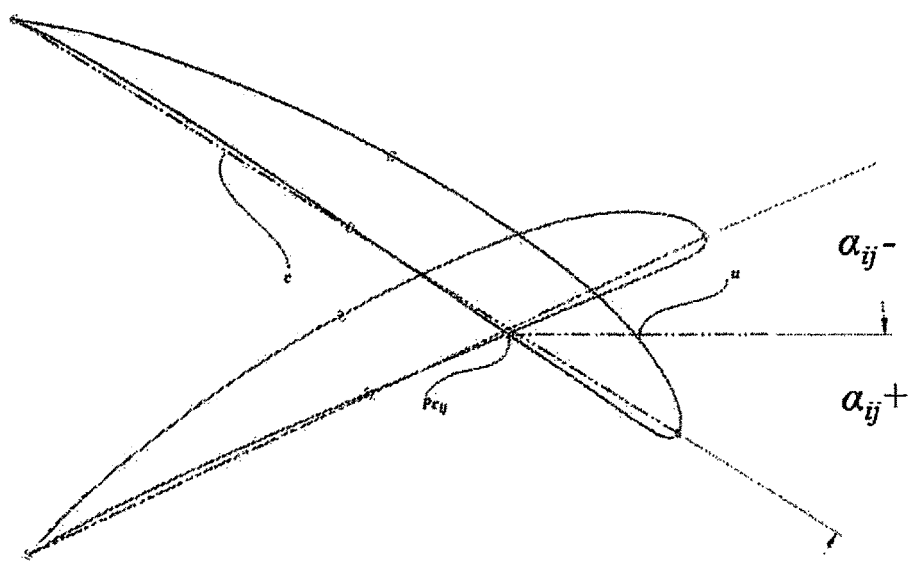
FIG. 4 illustrates a two-dimensional view of aerodynamic profile $PA_{ij}$.
Figure 5:
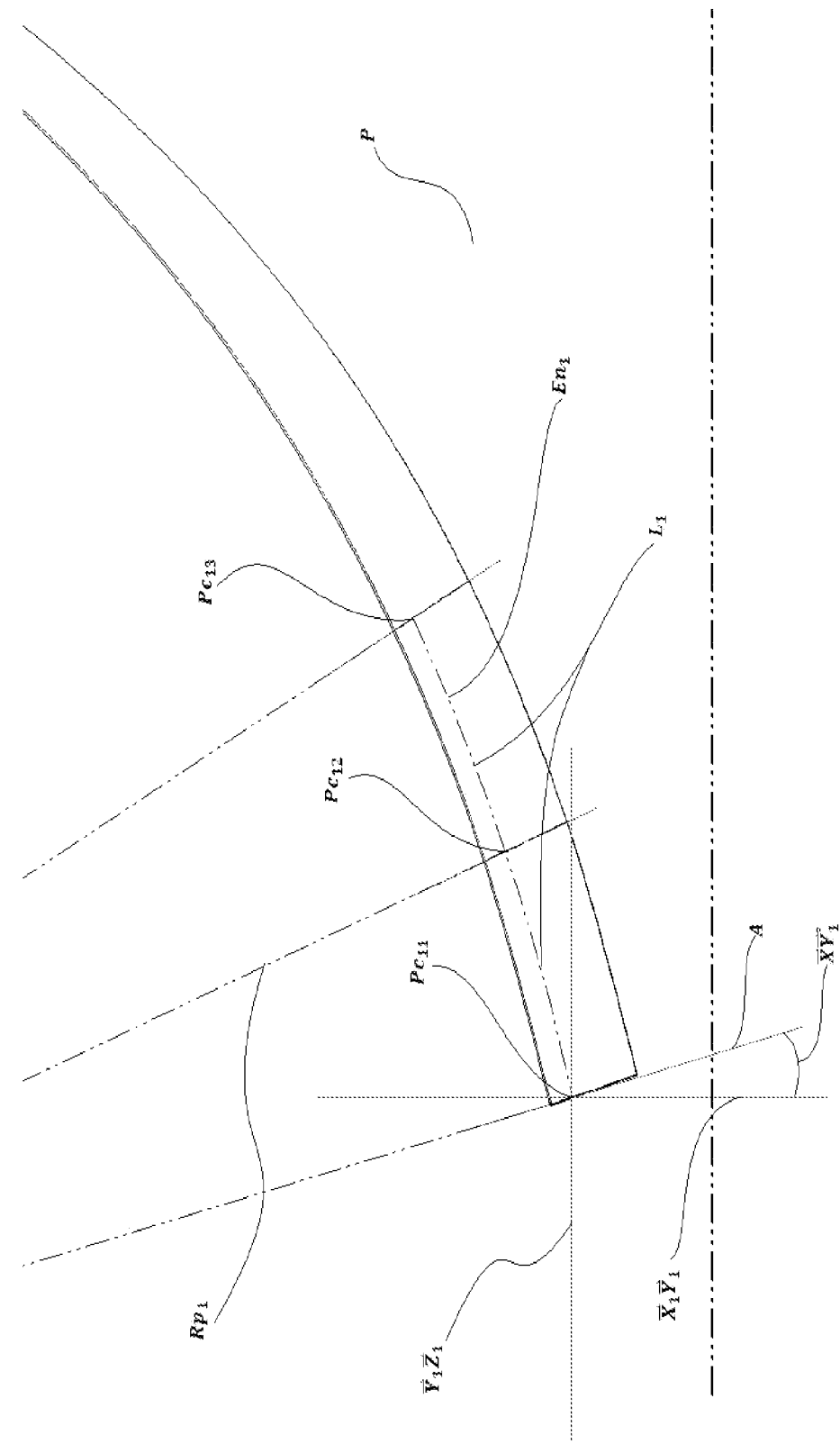
FIG. 5 illustrates a two-dimensional view of the blade's first section along the $\vec{X}_0 \vec{Z}_0$ plane.
Figure 6:
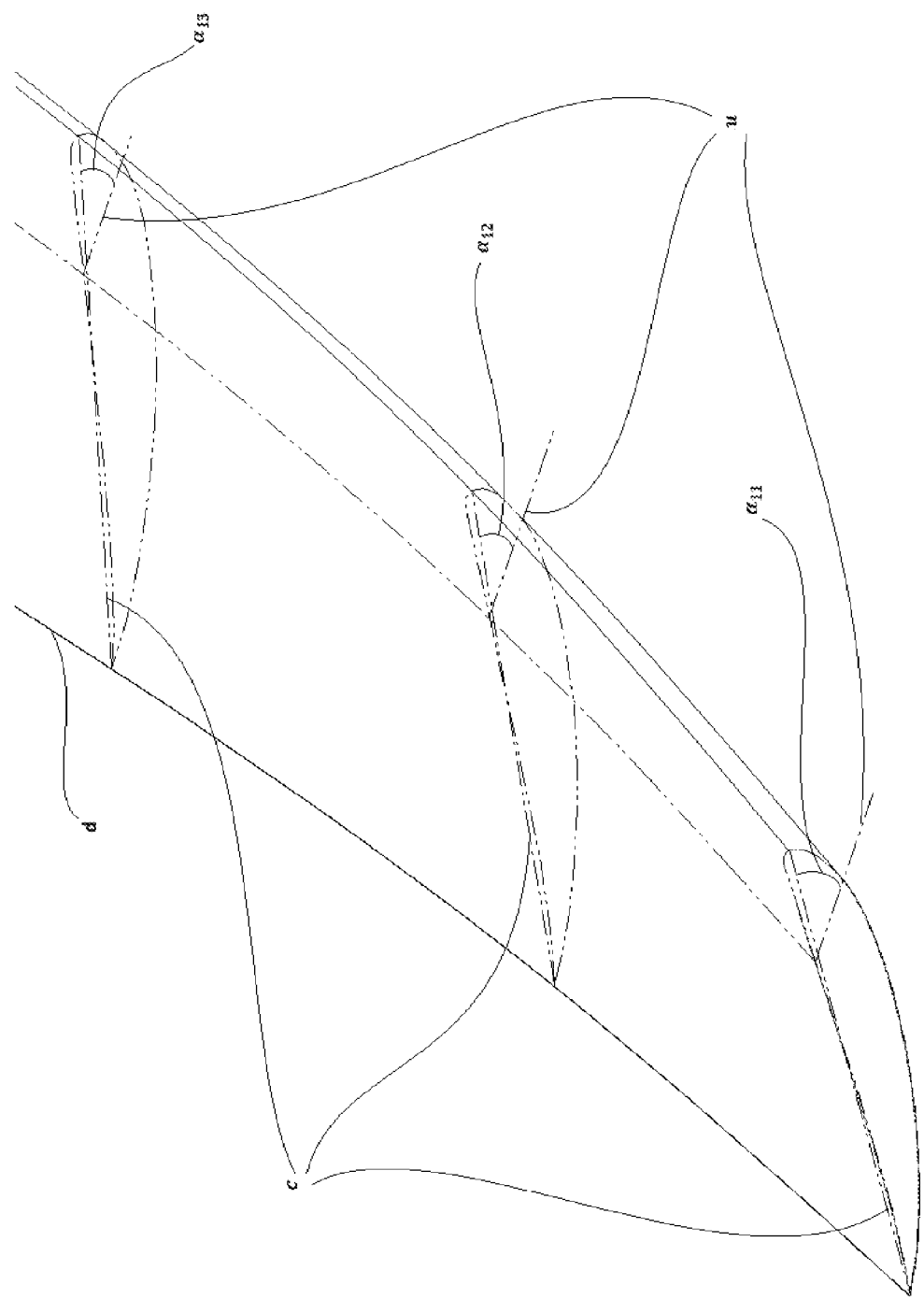
FIG. 6 illustrates a detailed three-dimensional view of the blade's cross-section.

However, this section may demonstrate progressive or regressive changes or a combination thereof in chord length, provided they are within the following ranges: $0.05*L \leq c_{11} \leq 0.3*L$; $0.046*L \leq c_{12} \leq 0.3*L$; $0.042*L \leq c_{13} \leq 0.3*L$. Making reference to FIG. 4, a two-dimensional view of aerodynamic profiles $PA_{ij}$ is shown, wherein each aerodynmic profile $PA_{ij}$ making part of first division section $En_j$ has an inclination angle $\alpha_{ij}$ ($\alpha_{11}\alpha_{12}\alpha_{13}$) formed between chord length c of each $PA_{ij}$ profile and u axis. The first aerodynamic profile in this section may lie between the following values, $-30° \leq \alpha_{11} \leq 120°$ and the profile inclination angle and point 2 may lie between $-34° \leq \alpha_{13} \leq 105°$. However, in the preferred embodiment, said inclination is limited by the following ranges $5° \leq \alpha_i \leq 25°$ and $1° \leq \alpha_i \leq 19°$, for profiles $\alpha_{11}$ and $\alpha_{13}$, respectively (also see FIG. 6).

Figure 7:
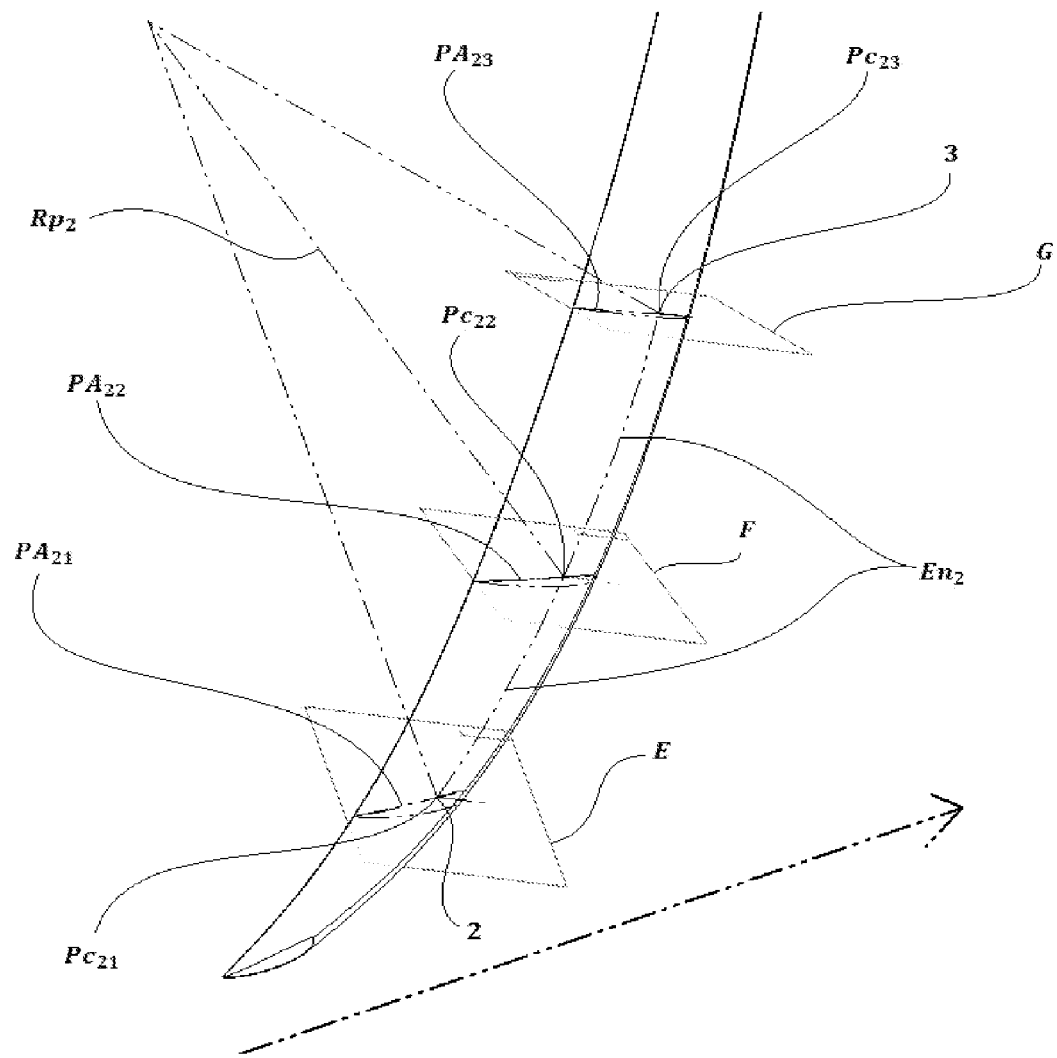
FIG. 7 illustrates a three-dimensional view of the blade's second section.

In FIG. 7, it may be noted that second division section $En_2$ initiates at point 2, has a preferred length of $L_2 = 0, 4*L$ and ends at point 3. This section corresponds to the internal zone, wherein the greatest percentage of aerodynamic forces that the blade generates in its entirety are concentrated. $En_2$ is a constant curve obtained from the polynomial interpolation of several points. Its constant bending radius $Rp_2$ has a focus located on plane P at a preferred distance of $Rp_2 = 2*L_2$; this bending radius may be in the following range: $1*L_2 \leq Rp_2 \leq 5*L_2$.

Section $En_2$ is made up of at least three (3) equidistant cross-sections, whose geometric shape is an aerodynamic profile $PA_{ij}$, called $PA_{21}$, $PA_{22}$ and $PA_{23}$. Each one of these profiles is found on a plane perpendicular to $En_2$; the first plane E corresponds to profile $PA_{21}$ and is located at point 2; the second plane F corresponds to profile $PA_{22}$ and it is located on sectional neutral axis $[En_2]$ at an intermediate point between 2 and 3; aerodynamic profile $PA_{23}$ is located on plane G and is located on point 3.

On the bottom curve of aerodynamic profiles $PA_{21}$, $PA_{22}$ and $PA_{23}$, called intratwo, points $Pc_{21}$, $Pc_{22}$ and $Pc_{23}$ are located, respectively. These points are at a distance of c/4 from the leading edge and by joining them in an arch containing them, the Sectional Neutral Axis $[En_2]$ is obtained.

If the material extrusion used in the first section (base) is continued, i.e. following the path described by curve $En_2$ and maintaining the shape of the multiple cross-sections $PA_{21}$, $PA_{22}$ and $PA_{23}$ in its sweep, the solid having the geometric shape of the invention is generated in the internal zone of the blade.

This second section in contrast to the first shows two sectional changes in its configuration of greatest performance; the first being a progressive change in the length of chord length c from point 2 up to near the central point of curvature $En_2$. This point, preferably located on plane F is considered the inflection point of the chord of the section's aerodynamic profiles, since from it, chord length c of the cross-sections describe a regressive behavior and its size begins to decrease until point 3. In accordance with this embodiment, the chord has a value of 0.099*L, 0.104*L, 0.094*L, for profiles $PA_{21}$, $PA_{22}$ and $PA_{23}$, respectively.

Nevertheless, this section may show progressive or regressive changes or combinations thereof in chord length, provided they are within the following ranges: $0.042*L \leq c_{21} \leq 0.3*L$; $0.034*L \leq c_{22} \leq 0.3*L$; $0.026*L \leq c_{23} \leq 0.3*L$.

Each aerodynamic profile $PA_{ij}$ making part of section $En_2$ has an inclination angle $\alpha_{ij}$ ($\alpha_{21}\alpha_{22}\alpha_{23}$) formed between chord length c and each $PA_{ij}$ profile and the u axis. The first aerodynamic profile of this section may lie within the following values, $-34° \leq \alpha_{21} \leq 105°$ and the final profile inclination angle at point 3 may range between $-41° \leq \alpha_{23} \leq 60°$. However, in its configuration of greatest performance, said inclination is bound by the ranges $1° \leq \alpha_i \leq 19°$ and $-5° \leq \alpha_i \leq 13°$, for profiles $\alpha_{21}$ and $\alpha_{23}$, respectively.

The third division section $En_3$ initiates at point 3, has a preferred length of $L_3 = 0.4*L$ and ends at point 4. This section corresponds to the external zone, and here is where the greatest rotational velocity components are found, and therefore its inertia must be the least in order to reduce stresses; this is obtained by decreasing the size of the aerodynamic profiles which make part of the section. $En_3$ is a constant curve obtained from the polynomial interpolation of various points. Its constant bending radius $Rp_3$ has a focus located at plane P at a preferred distance of $Rp_3 = 5*L_3$; said bending radius can range between $1*L_3 \leq Rp_3 \leq 12*L_3$.

Figure 8:
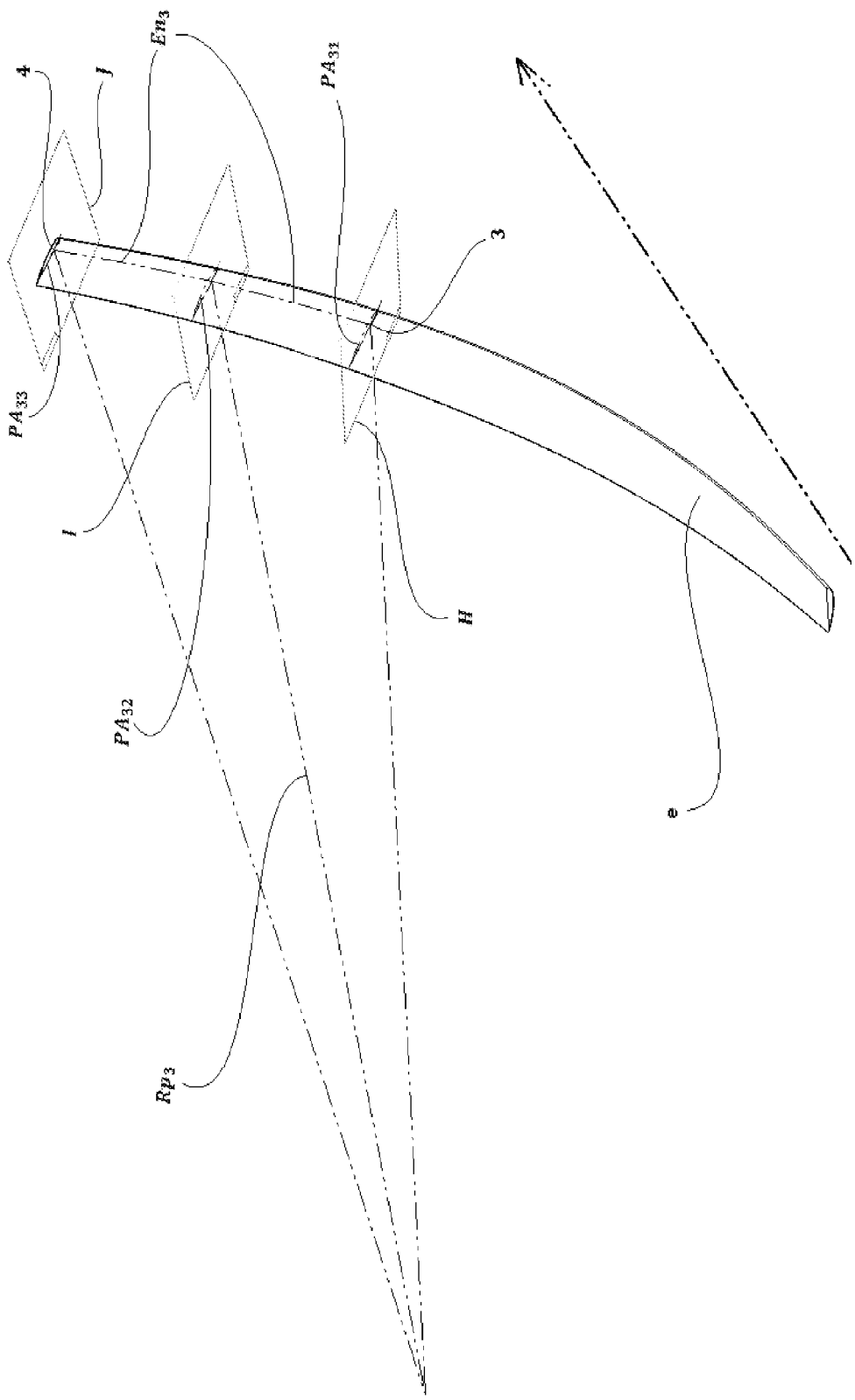
FIG. 8 illustrates a three-dimensional of the blade's third section.

Making reference to FIG. 8, section $En_3$ is shown which is made up of at least three (3) equidistant cross-sections, whose geometric shape is an aerodynamic profile $PA_{ij}$, called $PA_{31}$, $PA_{32}$ and $PA_{33}$. Each one of these profiles is found on a plane perpendicular to $En_3$; the first plane H corresponds to profile $PA_{31}$ and is located at point 3; the second plane I corresponds to profile $PA_{32}$ and is located on sectional neutral axis $[En_3]$ at an intermediate point between 3 and 4; aerodynamic profile $PA_{33}$ is located on plane J and is located on point 4.

On the bottom curve of aerodynamic profiles $PA_{31}$, $PA_{32}$ and $PA_{33}$, called intratwo, points $Pc_{31}$, $Pc_{32}$ and $Pc_{33}$ are located, respectively. These points are at a distance of c/4 from the leading edge and by joining them in an arch containing them, Sectional Neutral Axis $[En_3]$ is obtained.

Continuing with material extrusion of the second section, i.e. following the path described by curve $En_3$ and maintaining the shape of the multiple cross-sections (aerodynamic profiles) during its sweep, the solid having the geometric shape of the invention is generated in the external zone.

This third and preferably last section, develops a regressive change in its transverse length for the embodiment of greatest performance; this is due to the fact that chord length c decreases its size as it moves away from the beginning of curve $En_3$ at point 3. In accordance with this embodiment, the chord has a value of 0.094*L, 0.080*L, 0.070*L, for profiles $PA_{31}$, $PA_{32}$ and $PA_{33}$, respectively.

Nevertheless, this section may show progressive or regressive changes or combinations thereof in chord length, provided they are within the following ranges: $0.026*L \leq c_{31} \leq 0.3*L$; $0.018*L \leq c_{32} \leq 0.3*L$; $0.01*L \leq c_{33} \leq 0.3*L$.

Each aerodynamic profile $PA_{ij}$ making part of section $En_3$ has an inclination angle $\alpha_{ij}$ ($\alpha_{31}\alpha_{32}\alpha_{33}$) formed between chord length c of each $PA_{ij}$ profile and u axis. The first aerodynamic profile in this section may lie between the following values, $-41°\leq\alpha_{ij}\leq60°$ and the profile inclination angle at point 4 may lie between $-44°\leq\alpha_{33}\leq16°$. However, in its configuration of greatest performance, said inclination is limited by the following ranges $5°\leq\alpha_i\leq13°$ and $-5°\leq\alpha_i\leq15°$, for profiles $\alpha_{31}$ and $\alpha_{33}$, respectively.

The combination of bending radius ranges for sections $Rp_1$, $Rp_2$ and $Rp_3$ must be in such a manner that when the blade has its greatest curvature, a tangent line at point 4 must be at most perpendicular to rotation axis $\vec{Z}_0$.

Embodiment Example

In order to carry out the blade fluid dynamics testing, several tests were run using computer simulation. The following is information evidencing the invention's performance:

Operating conditions: sea-level
Numerical method used: Finite volumes
Simulator software used: Fluent (ANSYS).

The blades were designed in order to operate optimally both at low as well as high speeds with an optimal rotor tip speed ratio (TSR) of 6; i.e., the rotor must rotate at an RPM such that the tangential speed of the blade tip is 6 times the velocity of the fluid it faces.

Figure 12:
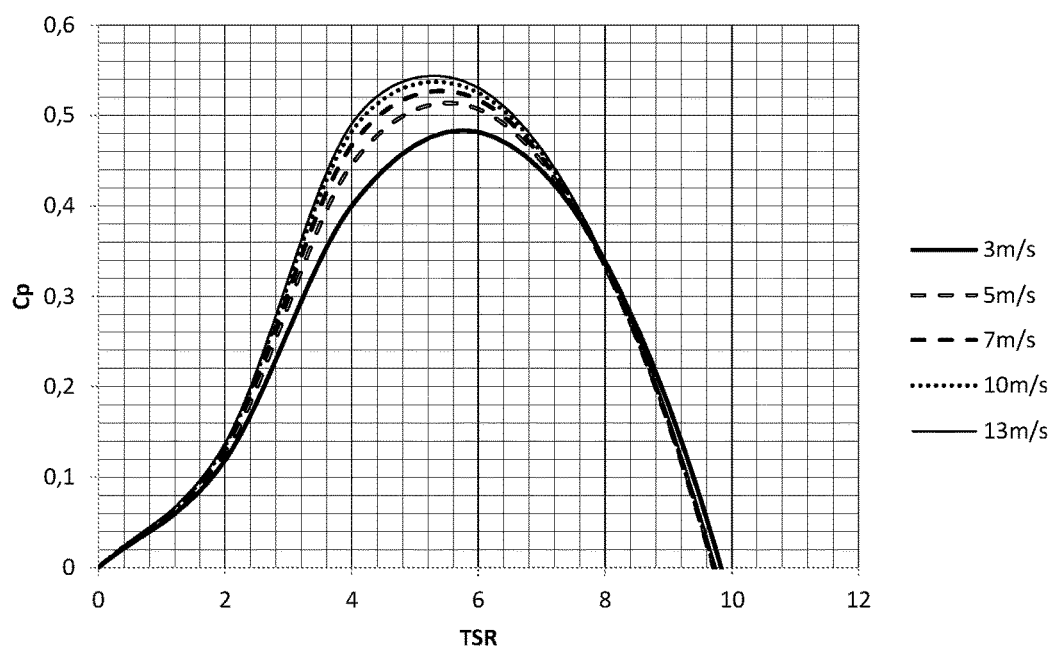
FIG. 12 illustrates the blade's Cp (coefficient of power) for different speeds and different TSR.

FIG. 12 shows the blade's Cp (coefficient of power) for different speeds and different TSR. This demonstrated that efficiencies (Cp) over 40% for TSR between 4 and 7 are obtained. However, the greatest efficiency is gained for TSR between 5 and 6, the range in which the system is calculated will operate, as demonstrated in the FIG. 12. It is reminded that the maximum efficiency a rotor can achieve is 59.3%, which corresponds to the Betz limit which is 0.593.

Figure 9:
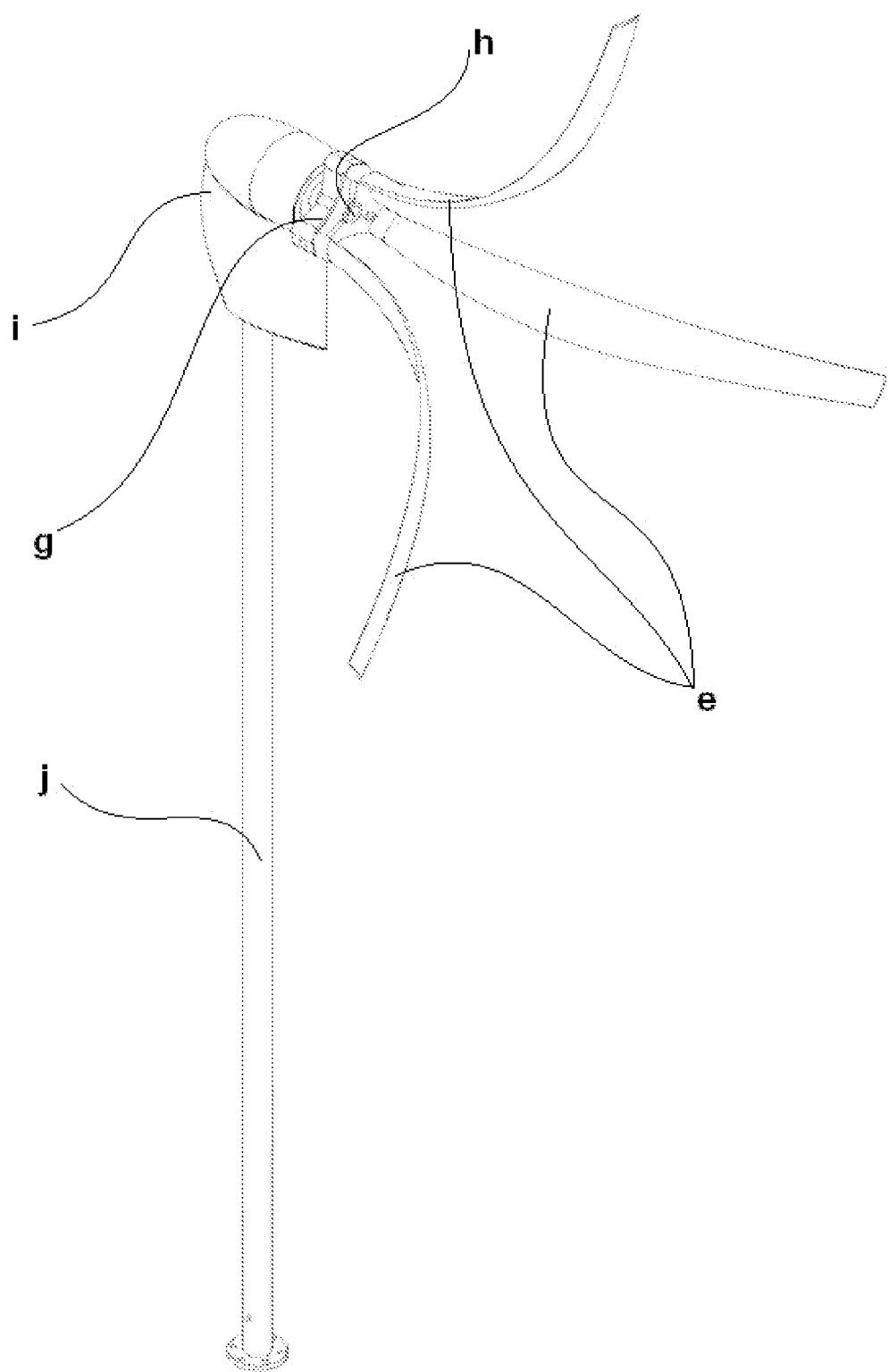
FIG. 9 illustrates a three-dimensional view of the configuration in a preferred embodiment for the wind power generation system.

The performance demonstrated in FIG. 12 corresponds to one of the possible configurations whereby the invention may be constituted, mainly the preferred embodiment for a wind power generation system as shown by FIG. 9. This array comprises a total of three blades (e) radially placed at a 120° angle from each other, said blades (e) are fixed in the direction stated above by a support system (g); said support system (g) is attached to an electrical energy generating system having a rotation axis (h) (in the same location as imaginary rotation axis Z 0) allowing for rotational movement of the blades (e) in the direction illustrated by the vectors (m); a shaft (j) located vertically which elevates the system up to a determined height, the electrical energy generating system is attached thereto which possesses a rotation axis (h) from which the support system (g) is attached which in turn holds the blades (e); a keel (i) attached to the shaft (j) which purpose is to cover the frontal zone of the system in order to smooth the fluid's flow (k) that impacts the blades (e); in this configuration of the preferred embodiment, said fluid (k) is air.

Figure 10:
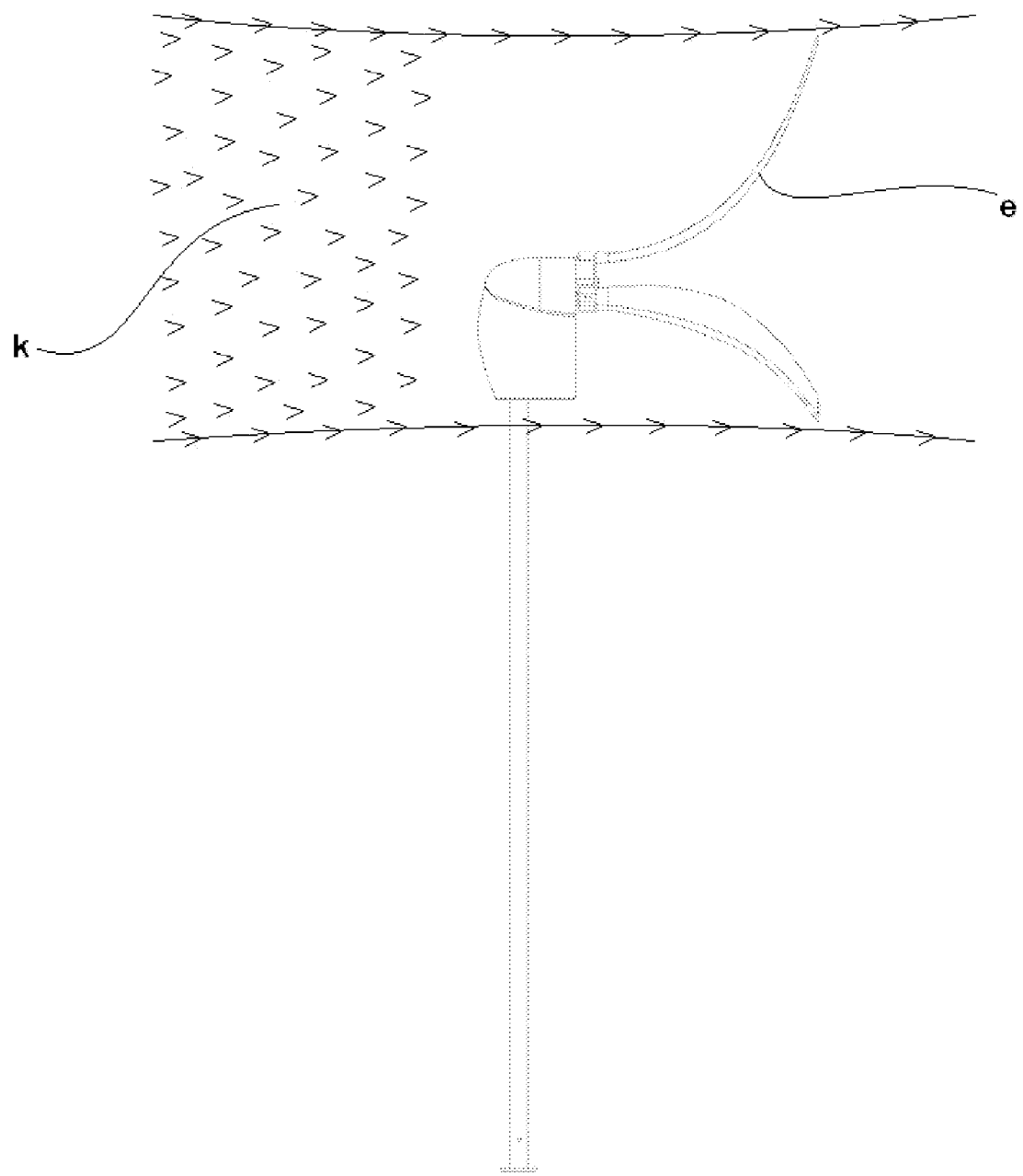
FIG. 10 illustrates a view of the fluid flow through the wind power generation system.
Figure 11:
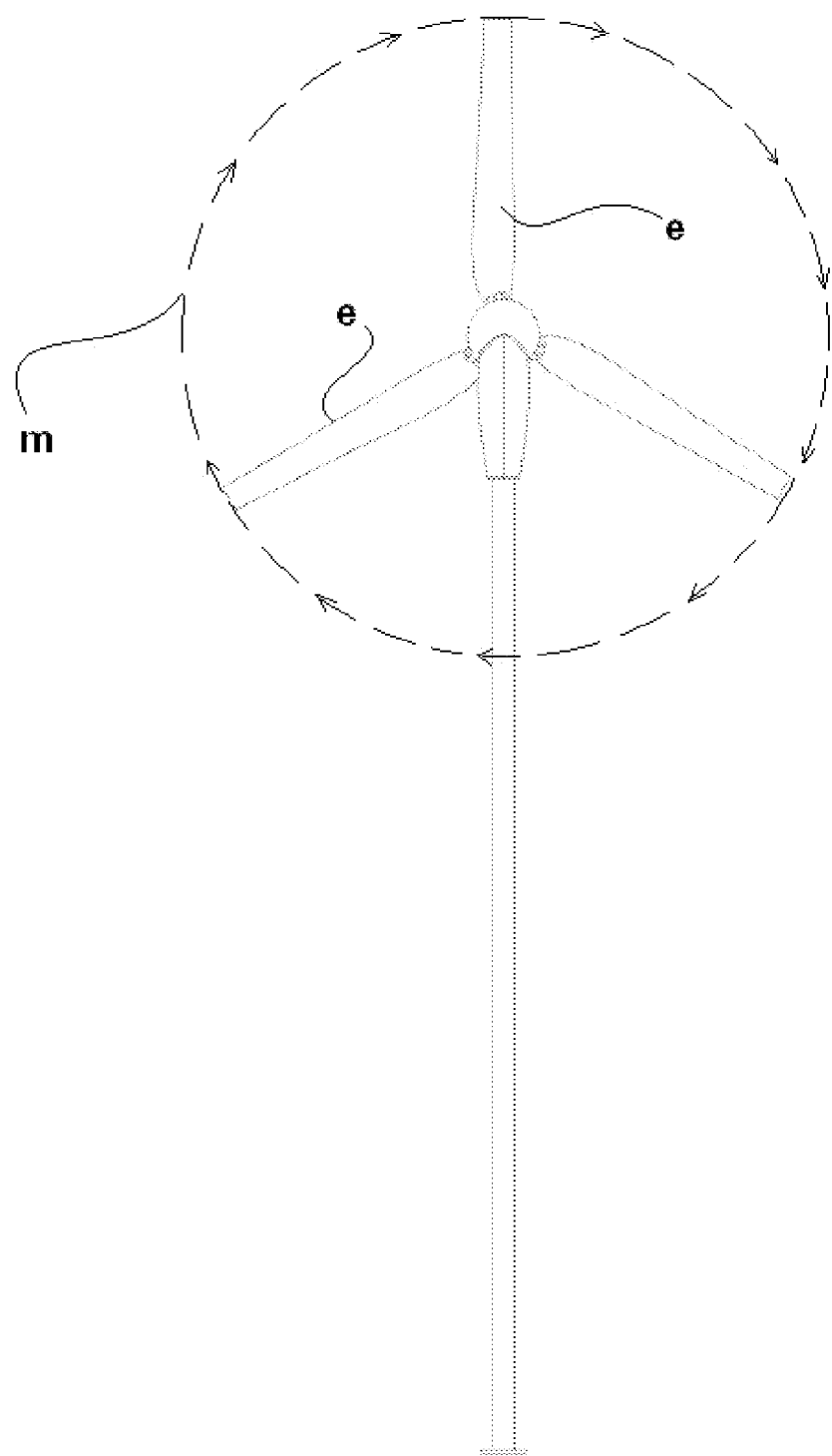
FIG. 11 illustrates the direction of rotation of the wind power generation system.

Making reference to FIGS. 10 and 11, the present invention's operation is shown under the configuration set forth above, comprising the transformation of linear kinetic energy possessed by fluid (k) in movement, in rotational movement (m) of the blades (e) when these are impacted by air. The rotation process begins when the air impacts the leading edge (f) and moves through the bottom and top surfaces comprising the aerodynamic profiles $PA_{ij}$ of blade (e), until arriving finally to the trailing edge (d). The air passing through the top zone acquires greater speed than the air passing through the bottom zone, thus generating a pressure differential on these surfaces, which finally translates in a lift force having a component in the rotation direction (m) thus generating torque with respect to the rotation axis (h).

The advantage offered by this invention with respect to prior art, is the capacity of transforming said kinetic energy in rotational movement which is directly correlated to the effective contact area between the blade (e) and the air flow (k); thus the invention presents an increase of said effective area in comparison to a conventional flat blade, this because of its curved shape which allows that for a same effective diameter, a greater contact surface can be made and therefore generating greater amount of energy.

As stated above, the curvature of blade (e) allows for kinetic energy possessed by the flow (k) of the fluid in movement to be used in greater proportion than that obtained using a conventional flat-shaped blade. The above is true given the air flow impacting the blade is not perpendicular as usually happens in conventional designs, wherein the greater part of the flow's energy is transformed into drag forces associated to impact pressure, and in contrast, the flow impacts blade (e) at an angle with respect to the blade (e) allowing for the flow to acquire speed components which are used in transforming flow kinetic energy in rotational movement (m).

It must be understood that the present invention is not found limited by the embodiments described and illustrated, since as shall be evident for those with skill in the art, variations and possible modifications exist that do not extend from the scope and spirit of the invention, which is only defined by the following claims.

The invention claimed is:

1. A blade for the generation of electrical power, from the transformation of kinetic energy of a fluid in rotation movement of the blade (e), wherein said movement is transmitted to a rotation axis coupled to said blade (e) located in an orthogonal framework of clearance planes formed by Cartesian axes $[\vec{X}_0]$, $[\vec{Y}_0]$ and $[\vec{Z}_0]$, wherein:

the rotation axis is coaxial relative to axis $[\vec{Z}_0]$;

the origin of the orthogonal framework of clearance planes formed by Cartesian axes $[\vec{X}_0]$, $[\vec{Y}_0]$ and $[\vec{Z}_0]$ is located at the rotation axis and at the point wherein the rotation axis is coupled to the blade (e);

the blade (e) extends along axis $[\vec{Z}_0]$, longitudinally bound by a root (a) and a tip (b), wherein root (a) is located by an auxiliary reference framework $\vec{X}_1\vec{Y}_1\vec{Z}_1$ which is parallel to the orthogonal framework of clearance planes formed by Cartesian axes $[\vec{X}_0]$, $[\vec{Y}_0]$ and $[\vec{Z}_0]$;

the root (a) and the tip (b) are connected through a series of sectional and constant curvatures called sectional neutral axes $[En_r]$, which generate a continuous or discontinuous primary curvature called a primary neutral axis $[En]$;

the blade (e) has a cross-section limited by a leading edge (f) and a trailing edge (d), which upon joining leading edge (f) and the trailing edge (d) by means of continuous curves, configure an airfoil $[PA_{ij}]$ having a bottom curve and a top curve;

the curvature of the blade (e) has a length L from the root (a) to the tip (b), which is between 0.01 m and 30 m, said curvature is formed by joining a series of points $[Pc_{ij}]$, which are constructed over the bottom curve of the airfoil $[PA_{ij}]$, at a distance of c/4 from the leading edge (f), where c is the chord length of the airfoil $[PA_{ij}]$;

the origin of the framework $\vec{X}_1\vec{Y}_1\vec{Z}_1$ is located in the point wherein said primary neutral axis [En] crosses the airfoil [$PA_{ij}$] at the root (a);

the blade's shape comprises a first geometrical variation corresponding to a change in the chord length c of the airfoil [$PA_{ij}$] along the primary neutral axis [En];

the blade's shape comprises a second geometrical variation corresponding to an inclination varying along the primary neutral axis [En], said inclination is measured as a function of an inclination angle $\alpha_{ij}$ formed between the chord of each airfoil [$PA_{ij}$] and an axis u, wherein the axis u is perpendicular to a plane [P], and the plane [P] coincides with the $\vec{X}_0\vec{Z}_0$ plane and intersects the primary neutral axis [En] at point [$Pc_{ij}$]; and said inclination angle $\alpha_{ij}$ ranges between $-31° \leq \alpha_{ij} \leq 30°$ at the root (a) and between $-44° \leq \alpha_{ij} \leq 16°$ at the tip (b).

2. The blade (e) according to claim 1, wherein the blade (e) comprises three division sections of the primary neutral axis [En], called the first division section $En_1$, the second division section $En_2$ and the third division section $En_3$, wherein:

first division section $En_1$ comprises a first sectional neutral axis [$En_1$] and has a length $L_1$, which begins at the root (a) and ends at a point (2) located over the primary neutral axis [En], limited to a range between $0.15*L \leq L_1 \leq 0.25*L$, second division section $En_2$ comprises a second sectional neutral axis [$En_2$] and has a length $L_2$, which begins at point (2) and ends at a point (3) located over the primary neutral axis [En], limited to a range between $0.3*L \leq L_2 \leq 0.5*L$, third division section $En_3$ comprises a third sectional neutral axis [$En_3$] and has a length $L_3$, which begins at point (3) and ends at the tip (b), limited to a range between $0.3*L \leq L_3 \leq 0.5*$; and wherein the first division section $En_1$ is tangent to the second division section $En_2$ at point (2), and the second division section $En_2$ is tangent to the third division section $En_3$ at point (3).

3. The blade (e) according to claim 2, wherein the chord length c ranges between $0.05*L \leq c_{11} \leq 0.3*L$ at the root (a) and between $0.01*L \leq c_{33} \leq 0.3*L$ at the tip (b).

4. The blade (e) according to claim 2, wherein $L_1$ is 20% of L, $L_2$ is 40% of L, and $L_3$ is 40% of L.

5. The blade (e) according to claim 2, wherein:

the first division section $En_1$ corresponds to the root zone, from which the blade attaches to a horizontal rotation axis, maintaining throughout the first division section $En_1$ sweep the shape of its airfoils [$PA_{ij}$];

said root zone is a constant curve having a constant bending radius $Rp_1$, which provides a focus located on plane [P] at a distance bound by a range between $1.3*L_1 \leq Rp_1 \leq 57*L_1$;

a first plane A is located at the root (a) and is perpendicular to the sectional neutral axis [$En_1$], said plane A provides an angle $\vec{X}\vec{Y}_1°$ with plane $\vec{X}_1\vec{Y}_1$ in the range $0° \leq \vec{X}\vec{Y}_1° \leq 90°$;

said root zone comprises at least three (3) equidistant airfoils $PA_{11}$, $PA_{12}$ and $PA_{13}$, wherein each of these airfoils is located on a plane perpendicular to the sectional neutral axis [$En_1$], the first plane A located at the root (a) corresponds to airfoil $PA_{11}$; a second plane B located on the sectional neutral axis [$En_1$] at an intermediate point between the root (a) and point (2) belongs to the airfoil $PA_{12}$; and a third plane D located at point (2) corresponds to the airfoil $PA_{13}$, said sectional neutral axis [$En_1$] corresponds to joining points $Pc_{11}$, $Pc_{12}$ and $Pc_{13}$ located at a distance of c/4 from the leading edge (f) over the bottom curve of their corresponding airfoils $PA_{11}$, $PA_{12}$ and $PA_{13}$ at planes A, B and D, respectively;

the transverse length of said root zone provides progressive and regressive changes or combinations thereof of the chord length c, ranging between $0.05*L \leq c_{11} \leq 0.3*L$; $0.046*L \leq c_{12} \leq 0.3*L$ and $0.042*L \leq c_{13} \leq 0.3*L$;

each airfoil [$PA_{ij}$] making part of the root zone has an inclination angle $\alpha_{ij}$ ($\alpha_{11}$, $\alpha_{12}$ and $\alpha_{13}$, respectively), wherein the inclination angle $\alpha_{ij}$ at the root (a) ranges between $-31° \leq \alpha_{11} \leq 30°$ and the inclination angle $\alpha_{ij}$ at point (2) ranges between $-34° \leq \alpha_{13} \leq 105°$.

6. The blade (e) according to claim 5, wherein said angle $\vec{X}\vec{Y}_1°$, with plane $\vec{X}_1\vec{Y}_1$ ranges between $0° \leq \vec{X}\vec{Y}_1° \leq 40°$.

7. The blade (e) according to claim 6, wherein said angle $\vec{X}\vec{Y}_1°$ with plane $\vec{X}_1\vec{Y}_1$ ranges between $10° \leq \vec{X}\vec{Y}_1° \leq 20°$.

8. The blade (e) according to claim 5, wherein said chord length c undergoes a progressive change as it moves away from the root (a), said chord length c having a value of $0.082*L$, $0.092*L$, and $0.099*L$, for airfoils $PA_{11}$, $PA_{12}$ and $PA_{13}$, respectively.

9. The blade (e) according to claim 5, wherein the inclination angle $\alpha_{ij}$ at the root (a) ranges between $5° \leq \alpha_{11} \leq 25°$ and the inclination-angle $\alpha_{ij}$ at point (2) ranges between $1° \leq \alpha_{13} \leq 19°$.

10. The blade (e) according to claim 2, wherein:

the second division section $En_2$ corresponds to the internal zone, maintaining throughout its sweep the shape of its airfoils [$PA_{ij}$];

said internal zone is a constant curve having a constant bending radius $Rp_2$ which has a focus located on plane [P] at a distance bound by a range $1*L_2 \leq Rp_2 \leq 5*L_2$;

said internal zone comprises at least three (3) equidistant airfoils $PA_{21}$, $PA_{22}$ and $PA_{23}$, wherein each of these airfoils is located on a plane perpendicular to the sectional neutral axis [$En_2$], a first plane E located at point (2) corresponds to airfoil $PA_{21}$; a second plane F located on the sectional neutral axis [$En_2$] at an intermediate point between point (2) and point (3) belongs to the airfoil $PA_{22}$; and a third plane G located at point (3) corresponds to the airfoil $PA_{23}$;

said sectional neutral axis [$En_2$] corresponds to joining points $Pc_{21}$, $Pc_{22}$ and $Pc_{23}$ located at a distance of c/4 from the leading edge (f) over the bottom curve of their corresponding airfoils $PA_{21}$, $PA_{22}$ and $PA_{23}$ at planes E, F and G, respectively;

the transverse length of this internal zone provides progressive and regressive changes or combinations thereof of the chord length c, ranging between $0.042*L \leq c_{21} \leq 0.3*L$, $0.034*L \leq c_{22} \leq 0.3*L$ and $0.026*L \leq c_{23} \leq 0.3*L$;

each airfoil [$PA_{ij}$] making part of the internal zone has an inclination angle $\alpha_{ij}$ ($\alpha_{21}$, $\alpha_{22}$ and $\alpha_{23}$, respectively), wherein the inclination angle $\alpha_{ij}$ at point (2) ranges between $-34° \leq \alpha_{21} \leq 105°$ and the inclination angle $\alpha_{ij}$ at point (3) ranges between $-41° \leq \alpha_{23} \leq 60°$.

11. The blade (e) according to claim 10, wherein said transverse length of said internal zone comprises a first progressive change in the length of chord length c from point (2) up to an inflection point located on plane F at the middle of the sectional neutral axis [$En_2$], and a second regressive change in the length of chord length c until point (3), said chord length c having a value of 0.099*L, 0.104*L, and 0.094*L, for airfoils $PA_{21}$, $PA_{22}$ and $PA_{23}$, respectively.

12. The blade (e) according to claim 10, wherein the inclination angle $\alpha_{ij}$ at point (2) ranges between $1° \leq \alpha_{21} \leq 19°$ and the inclination angle $\alpha_{ij}$ at point (3) ranges between $-5° \leq \alpha_{23} \leq 13°$.

13. The blade (e) according to claim 2, wherein:
the third division section $En_3$ corresponds to the external zone, maintaining throughout its sweep the shape of its airfoils $[PA_{ij}]$;
said external zone is a constant curve having a constant bending radius $Rp_3$, which has a focus located on plane [P] at a distance bound by a range between $1*L_3 \leq Rp_3 \leq 12*L_3$;
said external zone comprises at least three (3) equidistant airfoils $PA_{31}$, $PA_{32}$ and $PA_{33}$, wherein each of these airfoils is located on a plane perpendicular to the sectional neutral axis $[En_3]$, a first plane H located at point (3) corresponds to airfoil $PA_{31}$, a second plane I located on the sectional neutral axis $[En_3]$ at an intermediate point between point (3) and the tip (b) belongs to the airfoil $PA_{32}$, and a third plane J located at the tip (b) corresponds to the airfoil $PA_{33}$;
said sectional neutral axis $[En_3]$ corresponds to joining points $Pc_{31}$, $Pc_{32}$ and $Pc_{33}$ located at a distance of c/4 from the leading edge (f) over the bottom curve of their corresponding airfoils $PA_{31}$, $PA_{32}$ and $PA_{33}$ at planes H, I and J, respectively;
the transverse length of this external zone provides progressive and regressive changes or combinations thereof of the chord length c, ranging between $0.026*L \leq c_{31} \leq 0.3*L$, $0.018*L \leq c_{32} \leq 0.3*L$ and $0.01*L \leq c_{33} \leq 0.3*L$;
each airfoil $[PA_{ij}]$ making part the external zone has an inclination angle $\alpha_{ij}$ ($\alpha_{31}$, $\alpha_{32}$ and $\alpha_{33}$, respectively), wherein inclination angle $\alpha_{ij}$ at point (3) ranges between $-41° \leq \alpha_{31} \leq 60°$ and the inclination angle $\alpha_{ij}$ at the tip (b) ranges between $-44° \leq \alpha_{33} \leq 16°$.

14. The blade (e) according to claim 13, wherein chord length c undergoes a regressive change as it moves away from point (3), said chord length c having a value of 0.094*L, 0.080*L, and 0.070*L, for airfoils $PA_{31}$, $PA_{32}$ and $PA_{33}$, respectively.

15. The blade (e) according to claim 13, wherein the inclination angle $\alpha_{ij}$ at point (3) ranges between $-5° \leq \alpha_{31} \leq 13°$ and the inclination angle $\alpha_{ij}$ at the tip (b) ranges between $-5° \leq \alpha_{33} \leq 15°$.

16. The blade (e) according to claim 2, wherein a tangent line at the tip (b) is at most, perpendicular to the rotation axis $\vec{Z}_0$ when the blade shows its greatest curvature according to the combination of bending radius $Rp_1$, $Rp_2$ and $Rp_3$ of the division sections $En_1$, $En_2$ and $En_3$, wherein:
$Rp_1$ is the constant bending radius of the first division section $En_1$ having a focus located on plane [P] at a distance bound by a range between $1.3*L_1 \leq Rp_1 \leq 57*L_1$;
$Rp_2$ is the constant bending radius of the second division section $En_2$ having a focus located on plane [P] at a distance bound by a range between $1*L_2 \leq Rp_2 \leq 5*L_2$;
$Rp_3$ is the constant bending radius of the third division section $En_3$ having a focus located on plane [P] at a distance bound by a range between $1*L_3 \leq Rp_3 \leq 12*L_3$.

17. The blade (e) according to claim 1, wherein said inclination angle $\alpha_{ij}$ ranges between $5° \leq \alpha_{ij} \leq 25°$ at the root (a) and between $-5° \leq \alpha_{ij} \leq 15°$ at the tip (b).

* * * * *